US011697389B2

(12) United States Patent
Sasaki et al.

(10) Patent No.: US 11,697,389 B2
(45) Date of Patent: Jul. 11, 2023

(54) AIRBAG DEVICE

(71) Applicant: ASHIMORI INDUSTRY CO., LTD., Settsu (JP)

(72) Inventors: Kou Sasaki, Settsu (JP); Yoshitaka Okagami, Settsu (JP); Ryogo Honda, Settsu (JP)

(73) Assignee: ASHIMORI INDUSTRY CO., LTD., Settsu (JP)

( * ) Notice: Subject to any disclaimer, the term of this patent is extended or adjusted under 35 U.S.C. 154(b) by 0 days.

(21) Appl. No.: 17/708,507

(22) Filed: Mar. 30, 2022

(65) Prior Publication Data
US 2022/0314921 A1    Oct. 6, 2022

(30) Foreign Application Priority Data

Mar. 31, 2021 (JP) .................................. 2021-059327

(51) Int. Cl.
*B60R 21/215*    (2011.01)
*B60R 21/21*    (2011.01)
(Continued)

(52) U.S. Cl.
CPC ............ *B60R 21/215* (2013.01); *B60R 21/21* (2013.01); *B60R 21/23138* (2013.01); *B60R 2021/2172* (2013.01); *B60R 2021/23153* (2013.01)

(58) Field of Classification Search
CPC ... B60R 21/215; B60R 21/21; B60R 21/2155; B60R 21/23138; B60R 2021/21506; B60R 2021/23153; B60R 2021/2172; B60R 13/0206; B60R 13/02; B60R 2013/0287; B60R 2013/0281; Y10T 24/30; Y10T 24/44026
(Continued)

(56) References Cited

U.S. PATENT DOCUMENTS

| 6,364,346 B1 * | 4/2002 | Preisler ................. B60R 21/213 |
| | | 280/730.2 |
| 6,719,321 B2 * | 4/2004 | Yasuhara .............. B60R 21/213 |
| | | 280/730.2 |

(Continued)

FOREIGN PATENT DOCUMENTS

| JP | 2002337641 A  * | 11/2002 |
| JP | 3674162 B2  * | 7/2005 |

(Continued)

*Primary Examiner* — Keith J Frisby
(74) *Attorney, Agent, or Firm* — Sughrue Mion, PLLC

(57) ABSTRACT

An airbag device including: a folded airbag; an attachment member configured to house the folded airbag and to be fixed to the vehicle; and an airbag lid including a main body portion and a protruding support portion. The main body portion is connected to the attachment member in a state of covering the folded airbag from a side opposite to the attachment member. The protruding support portion protrudes from the main body portion. At least a part of the protruding support portion is covered by the trim. The protruding support portion includes: a base end side edge portion joined to the main body portion; a tip end side edge portion provided on a side opposite to the base end side edge portion; a locking portion attaching to the trim; and a reinforcing portion provided continuously along the tip end side edge portion.

7 Claims, 7 Drawing Sheets

(51) Int. Cl.
    *B60R 21/231*     (2011.01)
    *B60R 21/217*     (2011.01)
(58) Field of Classification Search
    USPC ............... 280/728.2, 730.1, 730.2; 296/1.08
    See application file for complete search history.

(56) References Cited

U.S. PATENT DOCUMENTS

| | | | |
|---|---|---|---|
| 2007/0108742 A1* | 5/2007 | Itakura | B60R 21/213 |
| | | | 280/730.2 |
| 2009/0064470 A1* | 3/2009 | Hosoya | B60R 13/0206 |
| | | | 24/458 |
| 2017/0072900 A1 | 3/2017 | Fujiwara | |

FOREIGN PATENT DOCUMENTS

| | | | |
|---|---|---|---|
| JP | 2014213621 A | * | 11/2014 |
| JP | 201752494 A | | 3/2017 |

\* cited by examiner

AIRBAG DEVICE

CROSS-REFERENCE TO RELATED APPLICATION

This application claims priority from Japanese Patent Application No. 2021-059327 filed on Mar. 31, 2021, the entire subject-matter of which is incorporated herein by reference.

TECHNICAL FIELD

The present disclosure relates to an airbag device.

BACKGROUND ART

JP-A-2017-052494 discloses a rear seat side airbag device including an airbag module, a case, and an airbag door garnish. The airbag module is disposed between a side portion of a seatback and a wheel house. The airbag door garnish covers the airbag module from a vehicle interior side. An outer peripheral edge portion of the airbag door garnish is covered by a side garnish from the vehicle interior side.

A configuration in which a locking claw provided in the side garnish is locked to a locking hole formed in the airbag door garnish in order to keep a positional relationship between the airbag door garnish and the side garnish constant, is conceivable. However, when inserting the locking claw into the locking hole, a peripheral edge portion of the locking hole may be deformed in a direction away from the locking claw due to a pushing force of the locking claw. In this case, it is necessary to more strongly push the locking claw provided in the side garnish to lock the locking claw in the locking hole, and the assembling workability of the side garnish may deteriorate. The airbag door garnish is formed of a material that is easy to deform elastically so that occurrence of the airbag door garnish being broken at an unintended part due to an impact received at the time of inflation of an airbag is avoided. Therefore, the peripheral edge portion of the locking hole is easily elastically deformed at the time of pushing in the locking claw, and a problem such as deterioration of the assembling workability as described above is likely to arise.

SUMMARY OF INVENTION

An object of the present disclosure is to improve assembling workability of an airbag device or a trim in a configuration in which it is possible to attach the trim such as a side garnish to a periphery of the airbag device from a vehicle interior side.

An airbag device of which a trim of a vehicle is attached to a periphery, the airbag device including:
a folded airbag;
an attachment member configured to house the folded airbag and to be fixed to the vehicle; and
an airbag lid including a main body portion and a protruding support portion, the main body portion being connected to the attachment member in a state of covering the folded airbag from a side opposite to the attachment member, the protruding support portion protruding from the main body portion, at least a part of the protruding support portion being covered by the trim,
in which the protruding support portion includes:
a base end side edge portion joined to the main body portion;
a tip end side edge portion provided on a side opposite to the base end side edge portion;
a locking portion attaching to the trim and provided between the base end side edge portion and the tip end side edge portion; and
a reinforcing portion provided continuously along the tip end side edge portion.

In a configuration in which a trim is provided in a periphery of an airbag device, the assembling workability of the airbag device or the trim can be improved.

DESCRIPTION OF EMBODIMENTS

Hereinafter, an airbag device according to an embodiment will be described.

Application Example of Airbag Device

Figure 1:
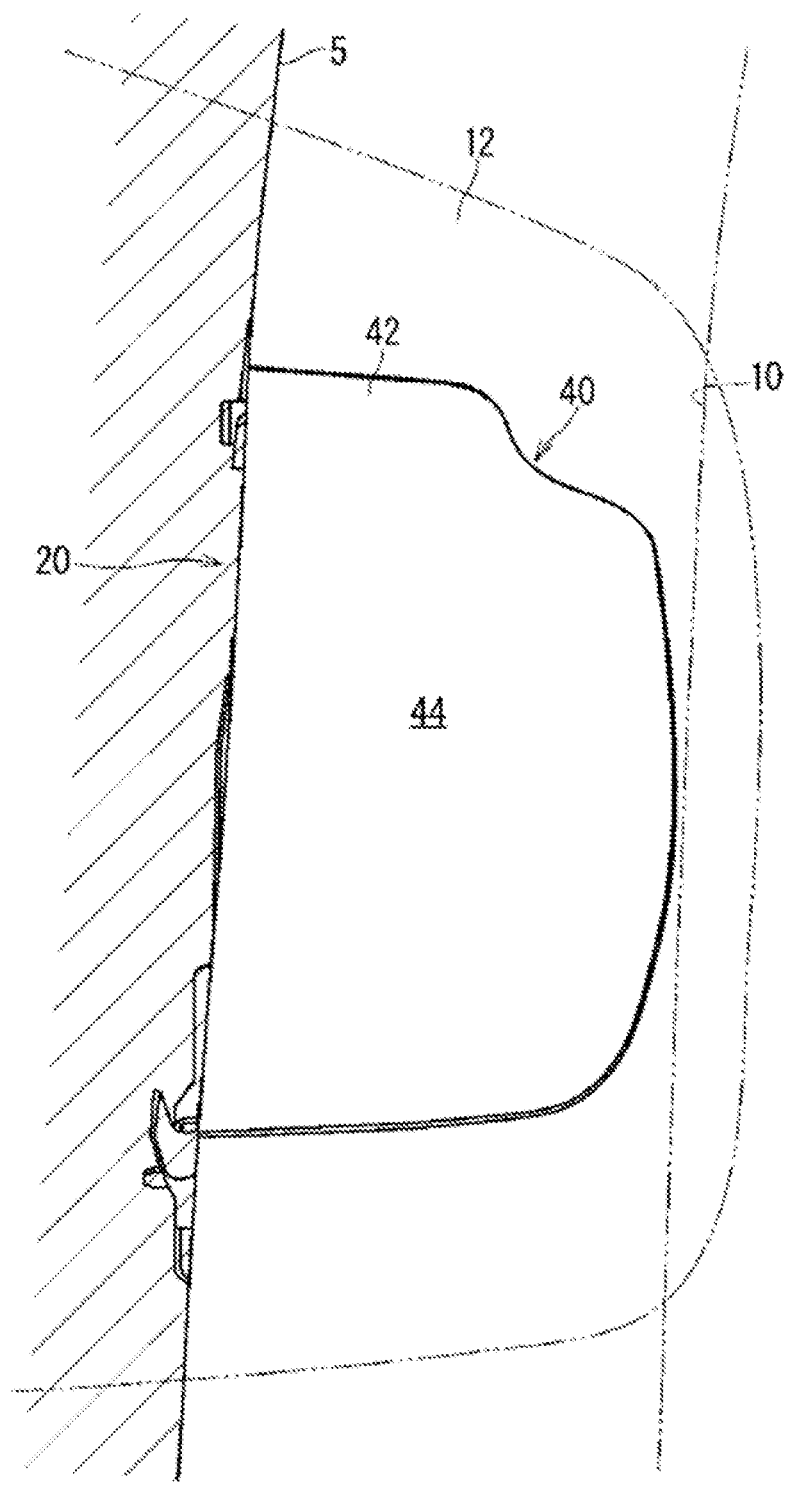
FIG. 1 is a front view of an airbag device according to an embodiment.

FIG. 1 is a front view of an airbag device 20. FIG. 1 shows a peripheral portion to which the airbag device 20 is attached.

The airbag device 20 is mounted in a vehicle. The airbag device 20 is a device that inflates and deploys when an impact is applied to the vehicle to mitigate an impact applied on an occupant. Ina state where the airbag device 20 is mounted on the vehicle, a trim is attached to a periphery of the airbag device 20. The trim is a resin panel serving as an interior material in the vehicle.

In the present embodiment, an example in which the airbag device 20 is a rear seat airbag device 20 will be described. The airbag device 20 is provided with a trim 12 on an inner side defined by an outer surface of a vehicle 5 (an outer surface of a body) and on a vehicle interior side of a wheel house. The trim 12 disposed on the interior side of the wheel house may be referred to as an inner panel of the wheel house. In a state of being disposed between a backrest 10 of the rear seat and the inner panel on an outer side in a vehicle width direction relative to the backrest 10, the trim 12 faces forward of the vehicle. The airbag device 20 is provided in the trim 12. An airbag 22 inflated from the trim 12 can be deployed between the occupant seated in the rear seat and a rear side door. Accordingly, an impact applied to the occupant from the outside can be mitigated, and an impact can be absorbed by receiving the occupant moving to the outer side in the vehicle width direction.

The airbag device 20 as described above needs to be firmly fixed to the vehicle to receive an impact produced by inflation and deployment of the airbag. Therefore, a portion serving as a base of the airbag device 20 is fixed to a portion having higher rigidity than the trim 12, for example, a metal body portion or the like directly or via a bracket. Therefore, after the airbag device 20 is attached to the high-rigidity portion of the vehicle, the trim 12 may be attached to surround a periphery of a surface of the airbag device 20.

In this case, when the trim 12 is attached to the airbag device 20, the trim 12 is firmly supported at a fixed position around the airbag device 20. In order to prevent an attachment structure of the trim 12 and the airbag device 20 from being exposed to the outside (the interior side), it is desirable to enable an attachment operation for the trim 12 by performing an operation of pressing the trim 12 at the periphery of the airbag device 20. For example, as will be described later, a locking hole 54 is formed in the airbag device 20, and a locking projection 14 that can be locked to the locking hole 54 is formed in the trim 12. Then, the trim 12 is attached to the periphery of the surface of the airbag device 20 by pushing the trim 12 into a space in the periphery of the airbag device 20 and pushing the locking projection 14 into the locking hole 54.

However, since a cover material of the airbag device 20 is a material that is easy to deform elastically, a peripheral edge portion of the locking hole 54 is deformed when the locking projection 14 is pushed into the locking hole 54, and it may be difficult to lock the locking projection 14 to the peripheral edge portion of the locking hole 54. In such a circumstance, in the airbag device 20, a protruding support portion 50, in which the locking hole 54 is formed, is reinforced to improve the assembling workability of the trim 12 in the periphery of the airbag device 20.

The trim 12 in the periphery of the airbag device 20 does not need to surround the entire periphery of the surface of the airbag device 20, and may be present only in a part of the periphery of the airbag device 20. The airbag device 20 is not essentially to be a rear seat airbag device 20, and may be an airbag device of which a trim is provided in a periphery in a state where the airbag device is mounted in a vehicle. For example, an instrument panel, as an example of a trim, is disposed in a periphery of a front-passenger-seat airbag device and a knee airbag device. Therefore, for example, the configuration according to the present embodiment may also be applied to the front-passenger-seat airbag device or the knee airbag device.

<Overall Configuration of Airbag Device>

Figure 2:
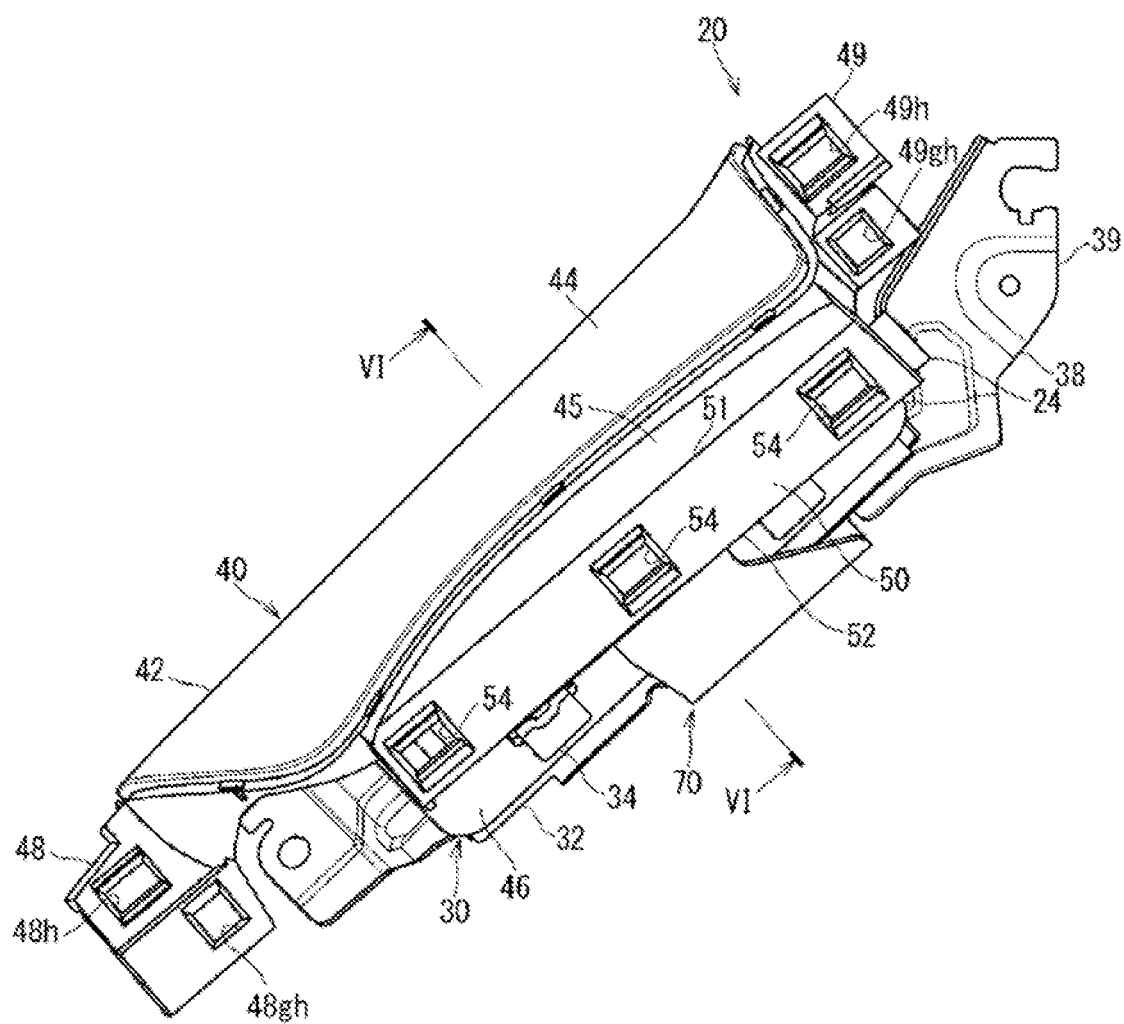
FIG. 2 is a side view of the airbag device as viewed from a center side in a vehicle width direction.
Figure 3:
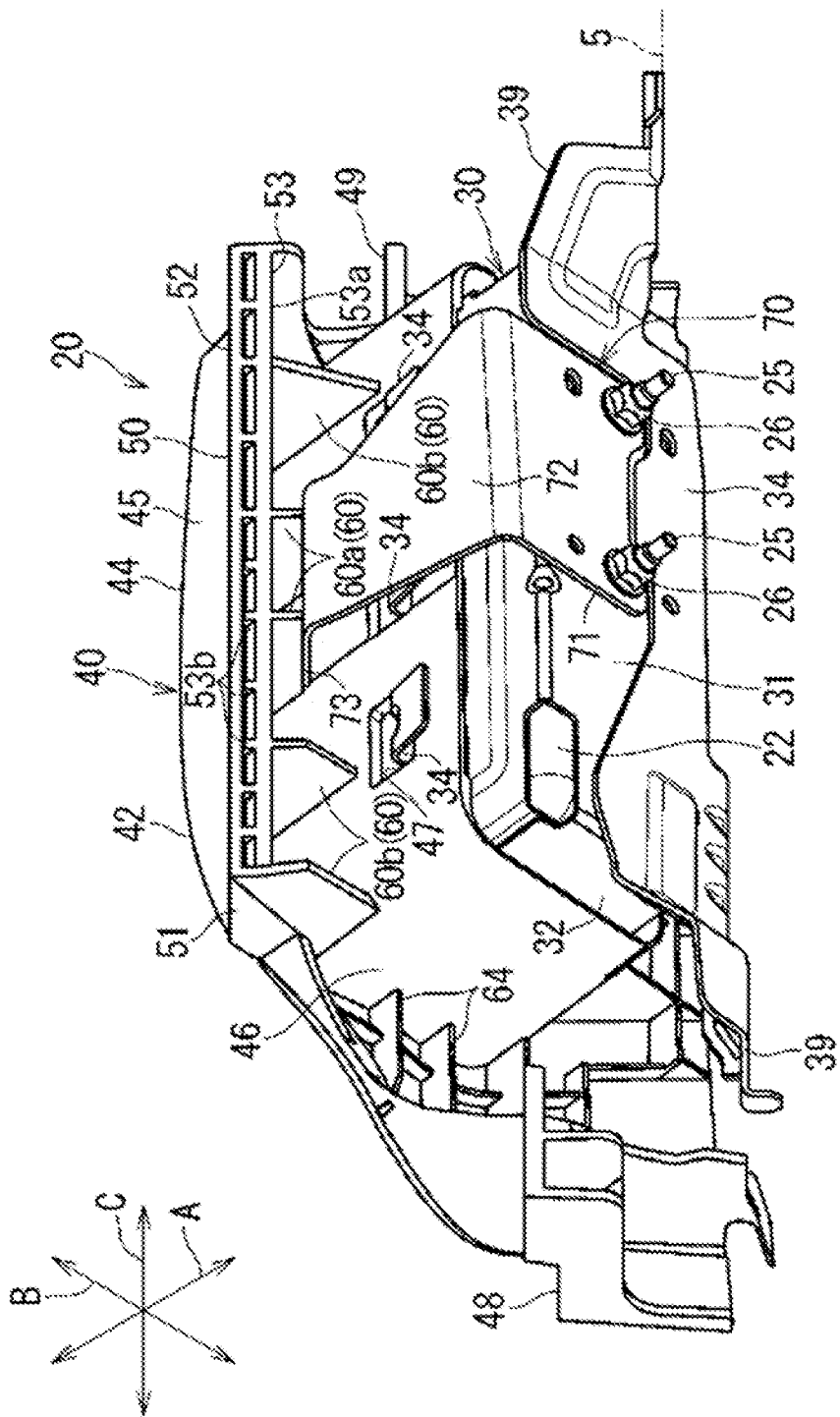
FIG. 3 is a perspective view of the airbag device.
Figure 4:
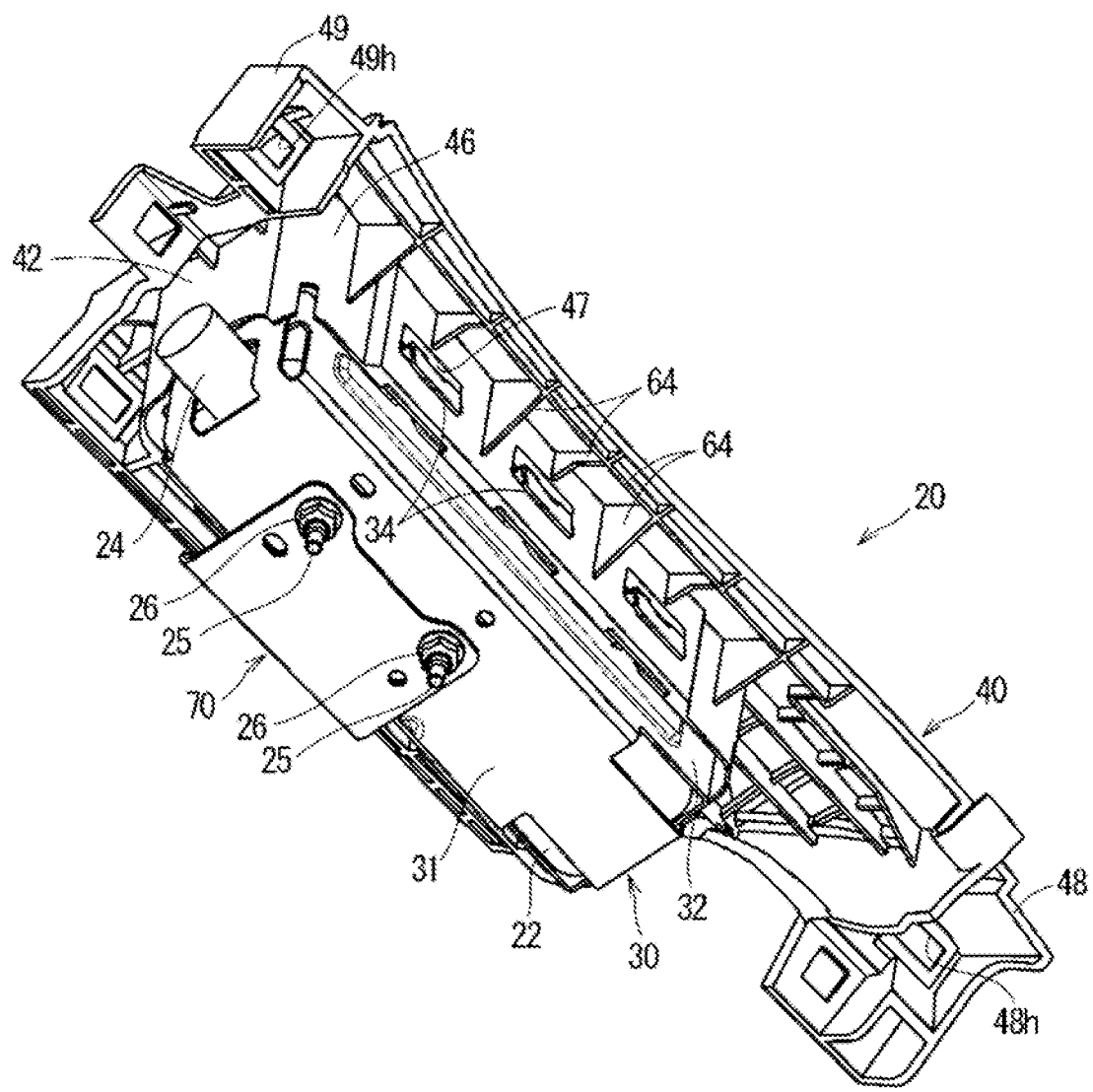
FIG. 4 is a rear view of the airbag device.
Figure 5:
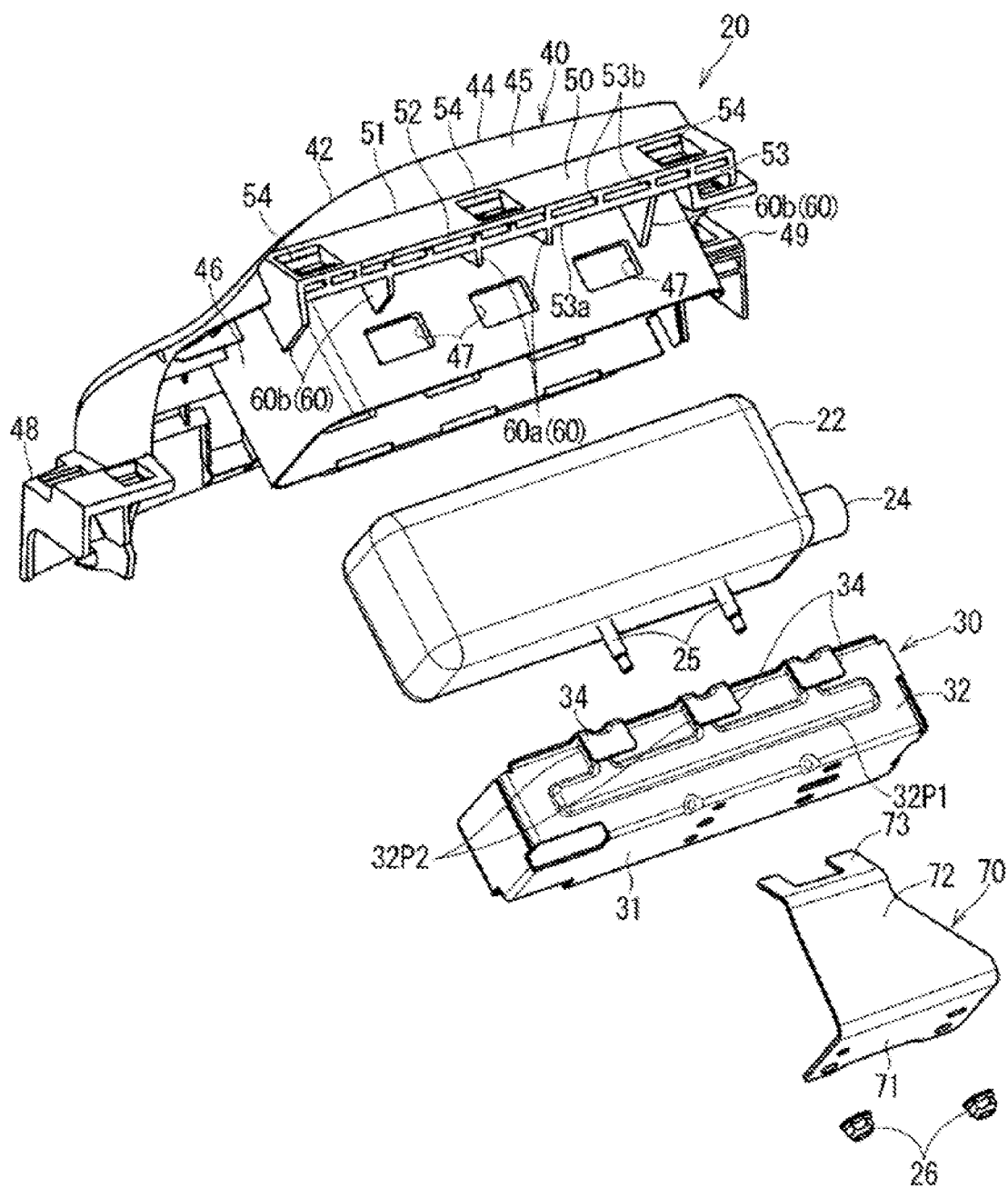
FIG. 5 is an exploded perspective view of the airbag device.
Figure 6:
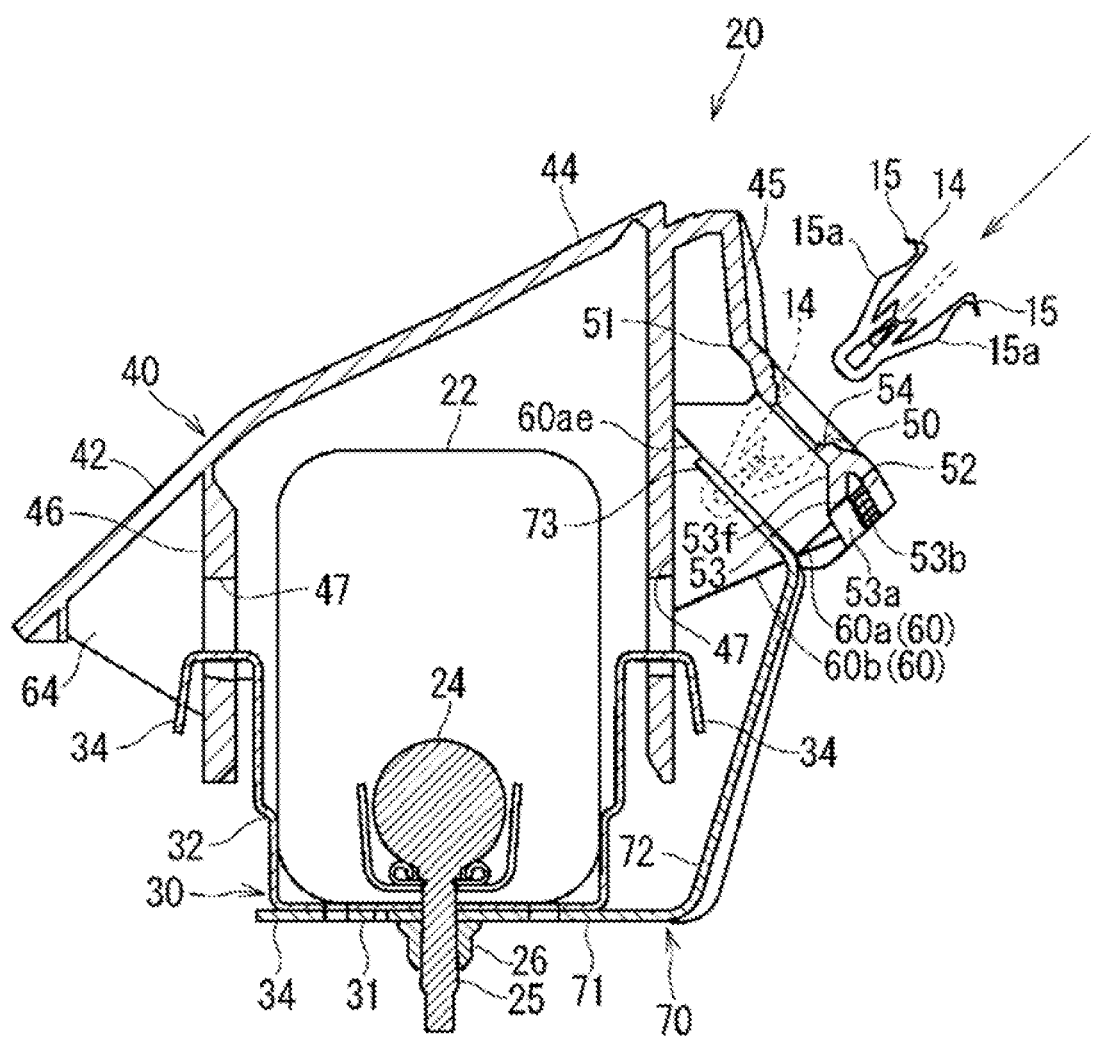
FIG. 6 is a cross-sectional view taken along a line VI-VI of FIG. 2.
Figure 7:
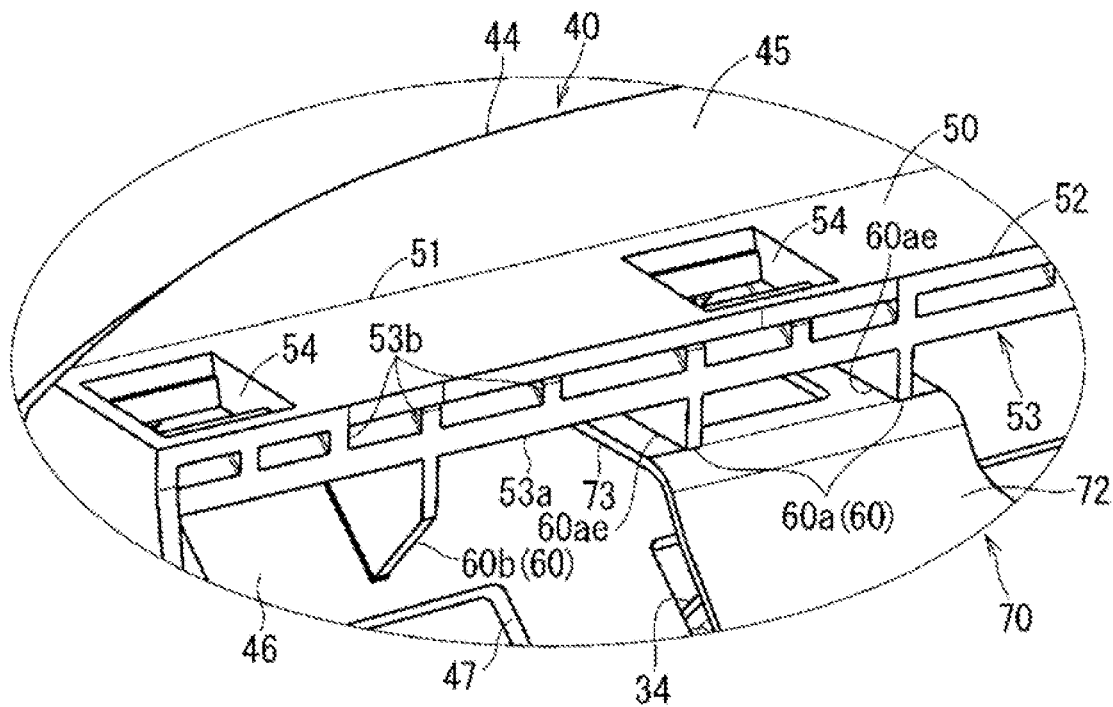
FIG. 7 is a partially enlarged perspective view of a protruding support portion of the airbag device.

FIG. 2 is a side view of the airbag device 20 as viewed from a center side in the vehicle width direction. FIG. 3 is a perspective view of the airbag device 20. FIG. 4 is a rear view of the airbag device 20, and FIG. 5 is an exploded perspective view of the airbag device 20. FIG. 6 is a cross-sectional view taken along a line VI-VI of FIG. 2. FIG. 7 is a partially enlarged perspective view of the protruding support portion 50 of the airbag device 20. In FIGS. 4 and 5, a fixing bracket 38 is omitted. In FIG. 6, a portion existing behind the cut section may be omitted.

The airbag device 20 includes the airbag 22, an attachment member 30, and an airbag lid 40.

The airbag 22 is configured to be able to inflate and deploy in a bag shape by sewing or the like a base fabric that is cut into a predetermined shape. The shape of the airbag 22 inflated and deployed is set in accordance with a shape of a space in which the airbag 22 is to be deployed, a part of an occupant that the airbag 22 receives, and the like. For example, the airbag 22 is formed in a bag shape that can be inflated and deployed in a flat shape between an occupant seated in the rear seat and an inner surface of a rear side door.

An inflator 24 is fixed to the airbag 22. In the present embodiment, the inflator 24 is formed in an elongated shape, more specifically, in a cylinder shape. A gas generating agent, an ignition device, and the like are built in the inflator 24. The inflator 24 is fixed to the airbag 22 in a state where at least a part of the inflator 24 is housed in the airbag 22. An example of the fixing structure will be described later.

A gas port is formed in a portion of the inflator 24 that is housed in the airbag 22. The inflator 24 causes the ignition device to perform ignition based on an ignition command signal or the like from an impact detection unit or the like of the vehicle, causes the gas generating agent to burn by the ignition, and supplies a gas generated by the burned gas generating agent into the airbag 22. Accordingly, the airbag 22 can be inflated and deployed.

The airbag 22 is folded. A folding configuration is not particularly limited, and may be, for example, a bellows shaped folding or a roll shaped folding. The airbag 22 is housed in the attachment member 30 in a folded state.

The attachment member 30 is a member that houses the airbag 22 and is fixed to the vehicle 5 (for example, a metal body). In the present embodiment, the attachment member 30 is formed in a rectangular parallelepiped box shape having an opening on one side. The attachment member 30 is formed by, for example, subjecting a metal plate to press working.

More specifically, the attachment member 30 includes a bottom portion 31 and a housing peripheral wall portion 32. The bottom portion 31 is formed in a rectangular plate shape elongated in one direction. The housing peripheral wall portion 32 is formed in a shape rising from a periphery of the bottom portion 31 toward one surface side of the bottom portion 31. Accordingly, a space defined by the housing peripheral wall portion 32 is formed on the one surface side of the bottom portion 31, and the folded airbag 22 is housed in this space. A side of the attachment member 30 opposite to the bottom portion 31 is open, and the airbag 22 can be inflated and deployed outward from an opening.

The opening is formed in a portion of the housing peripheral wall portion 32 that corresponds to a short edge on one side of the bottom portion 31. One end portion of the inflator 24 protrudes to the outside of the attachment member 30 through the opening (see FIG. 4).

In the housing peripheral wall portion 32, connecting pieces 34 are provided on outer surfaces of a pair of side wall portions corresponding to two long edges of the bottom portion 31. Each connecting piece 34 is formed in a shape including a base end portion extending outward from the outer surface of the housing peripheral wall portion 32 and a tip end portion extending from a tip end of the base end portion toward the bottom portion 31 (for example, an L shape as viewed along a long-edge direction).

The connecting piece 34 is formed by, for example, integrally forming a partial extension piece portion on an edge portion of the housing peripheral wall portion 32 on the side opposite to the bottom portion 31, and bending the extension piece portion in an L shape. The connecting piece may be formed separately from the peripheral wall portion, and then be welded, screwed, or the like to the peripheral wall portion.

The position and the number of the connecting pieces 34 are not limited. A plurality of the connecting pieces 34 may be formed on each of the two long edges of the bottom portion 31. In the present embodiment, three connecting pieces 34 are formed at intervals on each of the two long edges of the bottom portion 31.

In the present embodiment, the pair of side wall portions of the housing peripheral wall portion 32, which correspond to the two long edges of the bottom portion 31, are formed with partial reinforcing ridges 32P1 along a longitudinal direction of the side wall portions. A branch ridge 32P2 extending, from a middle portion of the reinforcing ridge 32P1 in a longitudinal direction of the reinforcing ridge 32P1, toward the connecting piece 34 is formed (see FIG. 5). Accordingly, the housing peripheral wall portion 32 is reinforced particularly around portions where the connecting pieces 34 are provided, and is less likely to be deformed. The reinforcing ridge 32P1 and the branch ridge 32P2 may be omitted. In the present embodiment, openings are formed at four corner portions of the bottom portion 31 of the attachment member 30. It is not essential to form these openings.

The airbag 22 and the inflator 24 are fixed to the attachment member 30 in the following manner. A screw portion 25 protrudes from a portion of the inflator 24 that is housed in the airbag 22. The screw portion 25 penetrates the airbag 22 and protrudes to the outside of the airbag 22. A screw insertion hole is formed in the bottom portion 31. The screw portion 25 passes through the screw insertion hole of the bottom portion 31 and protrudes to an outer side of the bottom portion 31. A nut 26 is screwed and fastened to the screw portion 25 at the outer side of the bottom portion 31. Accordingly, the inflator 24 is fixed to an inner surface of the bottom portion 31. In addition, since a part of the airbag 22 is sandwiched between the inflator 24 and the bottom portion 31, the airbag 22 is also fixed to the inner surface of the bottom portion 31.

The attachment member 30 is fixed to the vehicle 5 via the fixing bracket 38. In the present embodiment, the fixing bracket 38 is a member formed by subjecting a metal plate to press working or the like. The fixing bracket 38 is fixed to the attachment member 30 in a state where a part of the fixing bracket 38 is overlapped with the outer surface of the bottom portion 31. For example, the fixing bracket 38 is fixed to the bottom portion 31 of the attachment member 30 by screwing, welding, a caulking structure, or the like. The fixing bracket may be fixed to the peripheral wall portion of the attachment member. Another part of the fixing bracket 38 extends outward from the bottom portion 31 as a fixing extension portion 39. A screw insertion hole for screwing is formed in the fixing extension portion 39. The fixing extension portion 39 is fixed to the vehicle 5 by using a screw, so that the attachment member 30 is fixed to the vehicle 5 via the fixing bracket 38. The fixing bracket 38 may be fixed to the vehicle 5 by welding, caulking, or the like.

The attachment member may be directly fixed to the vehicle. For example, an extension piece for fixing to the vehicle may be formed in the attachment member, and the extension piece may be directly fixed to the vehicle.

The airbag lid 40 includes a main body portion 42 and the protruding support portion 50. The main body portion 42 connects to the attachment member 30 in a state of covering the airbag 22 from a side opposite to the attachment member 30. When the airbag 22 is covered by the main body portion 42, the airbag 22 is hidden from the occupant in a normal state of the vehicle 5. The protruding support portion 50 is provided by protruding from the main body portion 42. At least a part of the protruding support portion 50 is covered by the trim 12. The protruding support portion 50 supports at least a part of the trim 12 at the periphery of the airbag device 20.

More specifically, the airbag lid 40 is molded integrally with a mold using a resin or the like. When the airbag 22 is inflated and deployed, an opening for the airbag 22 to be inflated and deployed is made in the airbag lid 40. In addition, the airbag lid 40 is required to have elasticity to be deformed without being damaged at the time of receiving an inflation and deployment force of the airbag 22. Therefore, the airbag lid 40 is formed of a resin more elastic than that of the trim 12. For example, the trim 12 may be formed of polypropylene (PP), and the airbag lid 40 may be formed of an elastomer, for example, an olefin-based thermoplastic elastomer (TPO).

The main body portion 42 includes a garnish portion 44 and a peripheral wall portion 46.

The garnish portion 44 is a portion exposed to a vehicle interior. More specifically, the garnish portion 44 covers the airbag 22 on the side opposite to the bottom portion 31. A surface of the garnish portion 44 is continuous with a surface of the trim 12, is exposed to the vehicle interior, and constitutes an inner surface of the vehicle interior together with the trim 12. The garnish portion 44 is formed to be continuous with the surface of the trim 12 to form an inner wall surface of the vehicle interior. Therefore, the garnish portion 44 is formed in a flat surface shape, a curved surface shape, or a combined shape thereof, according to a shape of the inner wall surface of the vehicle interior. A tear line for making an opening through which the airbag 22 inflates and deploys may be formed in the garnish portion 44. The tear line is, for example, a groove recessed on the backside of the garnish portion 44, and the garnish portion 44 is partially torn along the tear line to make the opening.

The peripheral wall portion 46 protrudes, from a backside of the garnish portion 44 toward the attachment member 30, to surround the airbag 22 in the attachment member 30. Here, the peripheral wall portion 46 is formed in a shape protruding like a rectangular frame. An opening of the peripheral wall portion 46 is larger than the opening of the housing peripheral wall portion 32. Therefore, the housing peripheral wall portion 32 can be housed in the peripheral wall portion 46. A connecting hole 47 is formed in a portion of the peripheral wall portion 46 that corresponds to the connecting piece 34. Here, the connecting hole 47 is formed between a base end portion and a tip end portion of the peripheral wall portion 46. Three connecting holes 47 corresponding to the connecting pieces 34 are formed in each of portions corresponding to two long edges of the peripheral wall portion 46. The connecting hole 47 is formed in a rectangular shape.

In a state where the housing peripheral wall portion 32 of the attachment member 30 is housed in the peripheral wall portion 46, each connecting piece 34 is hooked to the corresponding connecting hole 47. In this state, a tip end portion of the connecting piece 34 is hooked on a portion of a peripheral edge of the connecting hole 47 that is on a tip end side of the peripheral wall portion 46. Accordingly, the peripheral wall portion 46 connects to the attachment member 30.

In a protruding direction A of the peripheral wall portion 46, an opening dimension of the connecting hole 47 is larger than a thickness dimension of the base end portion of the connecting piece 34 (see FIG. 3). Therefore, the connecting piece 34 is movable along the protruding direction A in a state of being hooked to the connecting hole 47. In a direction C that is orthogonal to the protruding direction A and a thickness direction B of the peripheral wall portion 46, the opening dimension of the connecting hole 47 is larger than a width dimension of the base end portion of the connecting piece 34. Therefore, the connecting piece 34 is movable along the direction C in a state of being hooked to the connecting hole 47. In addition, a clearance between the outer surface of the housing peripheral wall portion 32 and the tip end portion of the connecting piece 34 is larger than a thickness dimension of the peripheral wall portion 46.

Therefore, the connecting piece 34 is movable along the thickness direction B in a state of being hooked to the connecting hole 47.

Therefore, in a connected state of the peripheral wall portion 46 and the attachment member 30, the airbag lid 40 is movable with respect to the attachment member 30 within a range in which the connecting piece 34 can move while being hooked to the connecting hole 47.

The protruding support portion 50 protrudes from a part of an outer peripheral edge of the garnish portion 44 toward an outer peripheral side of the garnish portion 44. More specifically, an edge wall 45 extending inside of the garnish portion 44 is formed at one edge of the garnish portion 44. The protruding support portion 50 in an elongated rectangular plate shape is formed to extend from the edge wall 45 toward the outer peripheral side of the garnish portion 44. The protruding support portion 50 is inclined to be away from the backside of the garnish portion 44 toward the outer peripheral side of the garnish portion 44. A locking portion to which a counterpart locking portion provided on the trim 12 side is attached in a locked state, is formed in the protruding support portion 50.

The counterpart locking portion may be, for example, a locking projection 14 for fixing (see FIG. 6). More specifically, the locking projection 14 is a portion provided to protrude to aback surface side of the trim 12. The locking projection 14 includes, for example, a pair of locking pieces 15 that are elastically deformable in an inward and outward direction thereof. The locking piece 15 has a detachment preventing portion 15a that can be hooked to a locking hole 54. A configuration called a clamp, a clip, or the like may be applied to the locking projection 14. The locking projection 14 may be a portion molded integrally with the trim 12 by a mold, or may be molded separately from the trim 12 by a mold and then combined with the trim 12 by a fitting structure or by screwing, welding, or the like. Similar to the trim 12, the locking projection 14 may be formed of PP, or may be formed of a resin having a hardness similar to that of PP.

The locking portion may be, for example, the locking hole 54 to which the locking projection 14 can be locked to prevent detachment (see FIGS. 2,4 and 5). More specifically, the locking hole 54 may be a square hole. In the present embodiment, the locking hole 54 is formed, as a truncated pyramidal hole which gradually narrows along a pushing direction of the locking projection 14, to guide the locking projection 14, so that insertion of the locking projection 14 into the locking hole 54 is made easy. The locking hole 54 may be formed in a shape that allows easy hooking, for example, a round hole or an elliptical hole, according to a shape of the locking projection 14.

When the locking projection 14 is pushed into the locking hole 54, the locking piece 15 comes into contact with a peripheral edge of the locking hole 54 and is elastically deformed inward thereof. When the detachment preventing portion 15a of the locking piece 15 passes the peripheral edge of the locking hole 54, the locking piece 15 elastically returns to its original shape, and the detachment preventing portion 15a is locked to the peripheral edge of the locking hole 54 to prevent detachment. Accordingly, the trim 12 is supported by the airbag lid 40.

In the present embodiment, a plurality of locking holes 54 (here, three locking holes 54) are formed in the protruding support portion 50. The plurality of locking holes 54 are formed at intervals along a longitudinal direction of the protruding support portion 50.

Additional protruding support portions 48 and 49 are formed at both end portions in a longitudinal direction of the airbag lid 40 (see FIG. 2). Locking holes 48h and 49h similar to the locking hole 54 are formed in the additional protruding support portions 48 and 49. Opening directions (pushing directions) of the locking hole 54 and the locking holes 48h and 49h coincide with each other. The trim 12 is provided with the locking projections 14, which project in the same direction, at respective positions corresponding to the locking holes 54 and the locking holes 48h and 49h. Then, when the trim 12 is mounted around the garnish portion 44 in a state where the airbag device 20 is fixed to the vehicle, the locking projections 14 are pushed into the locking holes 54 and the locking holes 48h, 49h in the same direction. Accordingly, by the operation of mounting the trim 12 in the same direction, the locking projections 14 can be locked to the corresponding locking holes 54 and locking holes 48h, 49h to prevent detachment.

Guide holes 48gh and 49gh are formed in the additional protruding support portions 48 and 49 (see FIG. 2). The guide holes 48gh and 49gh, respectively, are formed in a hole shape that gradually widens in a direction away from the trim 12. When guide rods protruding from the trim 12 are inserted into the guide holes 48gh and 49gh, the operation of pushing the locking projections 14 into the locking holes 54 and the locking holes 48h and 49h can be easily performed. One or both of the additional protruding support portions 48 and 49 may be omitted.

As described above, the configuration in which the airbag lid 40 is movable relative to the attachment member 30 is useful for positioning the trim 12 and the airbag lid 40 at the time of attaching the trim 12. That is, in a state where the airbag device 20 is fixed to the vehicle 5, the airbag lid 40 is supported by the vehicle 5 via the attachment member 30. In this state, the trim 12 is mounted. The trim 12 is attached to the airbag lid 40, and is positioned with respect to the vehicle 5 at other portions. For example, another peripheral edge portion of the trim 12, which is not located adjacent to the garnish portion 44, is adjacent to another interior member or the like. Therefore, the trim 12 can be positioned with respect to the other interior member. When the locking projection 14 is pushed into the locking hole 54, a position of the locking hole 54 moves in accordance with a position of the locking projection 14. Accordingly, the airbag lid 40 can be moved to a position with reference to the trim 12. Therefore, the surface of the garnish portion 44 is disposed continuously with the surface of the trim 12.

In the present embodiment, an example is described in which the locking hole 54 is formed in the protruding support portion 50 and the locking projection 14 is provided on the trim 12 side. However, a locking projection projecting toward the trim side may be provided on the protruding support portion, and a locking portion having a locking hole to which the locking projection is to be locked may be provided on the trim side.

<Protruding Support Portion>

The protruding support portion 50 will be described in more detail. As described above, the protruding support portion 50 has an elongated rectangular plate shape, and is inclined to be away from the backside of the garnish portion 44 toward the outer peripheral side of the garnish portion 44. A portion of the protruding support portion 50, which is joined to the main body portion 42, is a base end side edge portion 51. A portion of the protruding support portion 50, which is on a side opposite to the base end side edge portion, is a tip end side edge portion 52. The locking holes 54 serving as the locking portion are provided between the base end side edge portion 51 and the tip end side edge portion 52. More specifically, the locking holes 54 are formed at three portions which are two portions near both ends in the longitudinal direction and a middle portion in the longitudinal direction of the protruding support portion 50. Each locking hole 54 has a square shape of which one edge is parallel to the base end side edge portion S1 and the other edge is parallel to the tip end side edge portion 52. The other two edges extend in a direction perpendicular to the base end side edge portion 51 and the tip end side edge portion 52.

The protruding support portion 50 includes a reinforcing portion 53 provided along the tip end side edge portion 52. The reinforcing portion 53 may be provided at least in a region where the locking hole 54 is formed, in the longitudinal direction of the protruding support portion 50. The reinforcing portion 53 may be provided in regions between the plurality of locking holes 54, in the longitudinal direction of the protruding support portion 50. In the present embodiment, the reinforcing portion 53 is provided on the entire tip end side edge portion 52 in the longitudinal direction of the protruding support portion 50.

The reinforcing portion 53 may be formed in a shape with a surface 53$f$. A distance between the surface 53$f$ and the tip end side edge portion 52 increases as the surface 53$f$ is extended from the locking hole 54 toward the tip end side edge portion 52 (see FIG. 6).

In the present embodiment, the reinforcing portion 53 includes a beam portion 53$a$ and a column portion 53$b$. The beam portion 53$a$ is formed in a shape extending along a longitudinal direction of the tip end side edge portion 52 in a state where a space is provided between the beam portion 53$a$ and the tip end side edge portion 52. More specifically, the beam portion 53$a$ is formed in an elongated plate shape and provided on the peripheral wall portion 46 side of the tip end side edge portion 52. The beam portion 53$a$ extends, from a linear portion positioned closer to the base end side edge portion 51 than a farthest tip end edge of the tip end side edge portion 52 toward the farthest tip end edge, in a direction away from the tip end side edge portion 52. Therefore, a triangular groove is formed between the tip end side edge portion 52 and the beam portion 53$a$ that gradually expands toward the farthest tip end edge of the tip end side edge portion 52. A surface of the beam portion 53$a$ that faces the peripheral wall portion 46 is the surface 53$f$. The surface 53$f$ may be parallel to the facing outer surface of the peripheral wall portion 46. Accordingly, it is easy to mold the surface 53$f$ and the outer surface of the peripheral wall portion 46 with a mold.

The column portion 53$b$ is provided between the tip end side edge portion 52 and the beam portion 53$a$, and is formed in a shape connecting the beam portion 53$a$ to the tip end side edge portion 52. Here, the column portion 53$b$ is formed in a triangular plate shape perpendicular to the tip end side edge portion 52. An inner surface of the tip end side edge portion 52 and an inner surface of the beam portion 53$a$ are connected to each other at a partial position in the longitudinal direction of the tip end side edge portion 52. Although one column portion 53$b$ may be provided, a plurality of column portions 53$b$ are provided at intervals in the longitudinal direction of the tip end side edge portion 52 in the present embodiment. Positions of the plurality of column portions 53$b$ are not limited. The plurality of column portions 53$b$ may be provided at fixed intervals in the longitudinal direction of the tip end side edge portion 52, or may be provided at different intervals.

Since the column portion 53$b$ connects the tip end side edge portion 52 and the beam portion 53$a$, the tip end side edge portion 52 is less likely to be deformed, and thus the protruding support portion 50 is less likely to be deformed.

The column portion 53$b$ may include a portion provided within a range, in which the locking hole 54 is provided, in the longitudinal direction of the tip end side edge portion 52. When the locking projection 14 is pushed into the locking hole 54, the peripheral edge of the locking hole 54 is likely to be subjected to bending deformation at a position corresponding to a center of the locking hole 54 in the longitudinal direction of the tip end side edge portion 52. In order to reduce the bending deformation, the column portion 53$b$ is preferably provided at a position close to a center of the range in which the locking hole 54 is provided, in the longitudinal direction of the tip end side edge portion 52. For example, when the range in which the locking hole 54 is provided in the longitudinal direction of the tip end side edge portion 52 is divided into three or five equal parts, the column portion 53$b$ may be provided in a central part.

The reinforcing portion 53 may be formed in a shape such that there is no space between the tip end side edge portion 52 and the beam portion 53$a$, for example, an elongated rib shape in which a tip end of the tip end side edge portion 52 is thicker than a front portion thereof.

<Support Portion>

The protruding support portion 50 is supported by a support portion from a side opposite to the trim 12. Since the support portion supports the protruding support portion 50, when the locking projection 14 is pushed into the locking hole 54, the protruding support portion 50 is less likely to be deformed in the pushing direction by being pushed in the pushing direction.

In the present embodiment, the support portion includes a supporting rib portion 60 and an additional support portion 70.

The supporting rib portion 60 is a portion provided between the protruding support portion 50 and the peripheral wall portion 46 and provided integrally with the airbag lid 40. That is, the supporting rib portion 60 is a portion that is molded integrally with the airbag lid 40 by a mold at the time of molding the airbag lid 40 by the mold. The supporting rib portion 60 has a plate shape extending in a direction orthogonal to the tip end side edge portion 52, and extends from a surface of the protruding support portion 50 on the peripheral wall portion 46 side toward the peripheral wall portion 46.

Although at least one supporting rib portion 60 may be provided, in the present embodiment, a plurality of supporting rib portions 60 are provided at intervals in a direction along the longitudinal direction of the tip end side edge portion 52. The plurality of supporting rib portions 60 are provided at positions at which the locking holes 54 are not disposed in the longitudinal direction of the protruding support portion 50. Among the plurality of supporting rib portions 60, two supporting rib portions 60 near the center in the longitudinal direction of the protruding support portion 50 (hereinafter, referred to as supporting rib portions 60$a$ when distinguished) are connected to the peripheral wall portion 46 near a base end of the peripheral wall portion 46 (see FIGS. 3 and 6). Among the plurality of supporting rib portions 60, a supporting rib portion 60 on an outward side of the supporting rib portion 60$a$ (hereinafter, referred to as a supporting rib portion 60$b$ when distinguished) is connected to the peripheral wall portion 46 at a length larger than that of the supporting rib portion 60$a$.

An inwardly-directed edge portion 60$ae$ of the supporting rib portion 60$a$, which is a portion close to the tip end side edge portion 52 and faces the peripheral wall portion 46, extends along the longitudinal direction of the protruding support portion 50 (see FIGS. 6 and 7).

The supporting rib portion 60 may extend continuously from any one of the column portions 53b, while being directed toward the peripheral wall portion 46, to the peripheral wall portion 46. In other words, the supporting rib portion 60 may be provided at the same position as any one of the column portions 53b in the longitudinal direction of the tip end side edge portion 52. Accordingly, in the longitudinal direction of the tip end side edge portion 52, a position at which the supporting rib portion 60 supports the reinforcing portion 53 and a position at which the column portion 53b connects the reinforcing portion 53 and the tip end side edge portion 52 are aligned with each other. Therefore, the supporting rib portion 60 can effectively support the portion where the column portion 53b is provided, and the tip end side edge portion 52 is less likely to be partially or entirely deformed.

A rib portion 64 is appropriately provided on the backside of the garnish portion 44. In addition, the rib portion 64 is connected to the peripheral wall portion 46 as appropriate.

The additional support portion 70 is a member added as a separate body to the airbag lid 40. The additional support portion 70 is, for example, a member formed by subjecting a metal plate to press working or the like. The additional support portion 70 may be a member formed of resin or the like.

The additional support portion 70 includes a base portion 71, a middle portion 72, and a tip-end-side support portion 73. In the longitudinal direction of the tip end side edge portion 52, a width of the additional support portion 70 is smaller than a length of the protruding support portion 50 and is set to a size at which the two supporting rib portions 60a can be supported. That is, in the longitudinal direction of the tip end side edge portion 52, a width of the additional support portion 70 is set to a size which is larger than the interval between the two supporting rib portions 60a and which is not large enough for the additional support portion 70 to reach the supporting rib portion 60b on the outward side of the supporting rib portion 60a.

The base portion 71 is disposed on the outer side of the bottom portion 31 of the attachment member 30. The base portion 71 is attached to an outer surface of the bottom portion 31 by using the screw portion 25 and the nut 26 for fixing the airbag 22 and the inflator 24.

The middle portion 72 extends from a portion of the base portion 71, which extends from the bottom portion 31, toward the tip end side edge portion 52 of the attachment member 30. The tip-end-side support portion 73 extends from a tip end of the middle portion 72 along the inwardly-directed edge portion 60ae of the supporting rib portion 60a. Accordingly, the inwardly-directed edge portion 60ae of the supporting rib portion 60a is supported from the side opposite to the trim 12 by an outer surface of the tip-end-side support portion 73. A recessed portion may be formed between the two inwardly-directed edge portions 60ae, in the tip-end-side support portion 73.

The additional support portion 70 may directly contact the back surface of the protruding support portion 50 or the reinforcing portion 53 to support the protruding support portion 50 from the side opposite to the trim 12.

One or both of the supporting rib portion 60 and the additional support portion 70 may be omitted.

<Attachment Operation of Trim>

An example of attachment operation of the trim 12 in a state where the airbag device 20 is fixed to the vehicle 5 will be described.

The airbag lid 40 is supported with respect to the vehicle 5 via the attachment member 30. The surface of the garnish portion 44 faces the vehicle interior. The plurality of locking holes 54 are aligned in the same direction and face the vehicle interior.

The plurality of locking projections 14 provided on the trim 12 are pushed into the corresponding locking holes 54 and the corresponding locking holes 48h and 49h.

At this time, since the locking projection 14 is pressed against the peripheral edge of the locking hole 54, a peripheral portion of the locking hole 54 of the protruding support portion 50 is pressed toward the side opposite to the trim 12 and tends to be deformed.

In particular, a portion of the protruding support portion 50 that is close to the tip end side edge portion 52 is not supported by the main body portion 42, and thus tends to be deformed greatly. However, the tip end side edge portion 52 of the protruding support portion 50 is reinforced by the reinforcing portion 53. Accordingly, deformation of the protruding support portion 50 is reduced. The deformation of the protruding support portion 50 is effectively reduced by the supporting rib portion 60 and the additional support portion 70.

As described, since the deformation of the protruding support portion 50 is reduced, when the locking projection 14 is pushed into the locking hole 54, the locking hole 54 is less likely to be displaced or deformed in a manner of escaping in the pushing direction.

Accordingly, the locking piece 15 of the locking projection 14 can be elastically deformed inward effectively by a force pushing the locking projection 14 into the locking hole 54. In addition, the locking projection 14 can be easily pushed into the locking hole 54 until the detachment-preventing portion 15a of the locking piece 15 passes the locking hole 54.

When the locking projection 14 is locked to the locking hole 54 and the locking holes 48h and 49h, a position of the airbag lid 40 is adjusted with respect to the trim 12, and the surface of the garnish portion 44 and the surface of the trim 12 are formed in a continuous surface.

In the above example, the trim 12 is assembled after the airbag device 20 is fixed.

However, for example, even when the airbag device is assembled after the trim is assembled first as in a case of a front-passenger-seat airbag device, the deformation of the protruding support portion 50 is similarly reduced, and thus the assembling workability of the airbag device is improved.

<Effects and the Like>

According to the airbag device 20 configured as described above, when the locking projection 14 serving as the counterpart locking portion is locked to the locking hole 54 serving as the locking portion, the locking projection 14 passes through the locking hole 54 while pushing the peripheral edge of the locking hole 54. At this time, a force directed toward the side opposite to the trim 12 is applied to the peripheral edge of the locking hole 54, with the base end side edge portion 51 joined to the main body portion 42 serving as a fulcrum. Accordingly, the locking hole 54 tends to be subjected to partial bending deformation. In particular, although the tip end side edge portion 52, which is a free end, is likely to be subjected to partial bending deformation in the longitudinal direction of the tip end side edge portion 52, the reinforcing portion 53 is provided on the tip end side edge portion 52 of the protruding support portion 50, and thus, partial deformation of the protruding support portion 50 is reduced. Accordingly, it is easy for the locking projection 14 to pass through the locking hole 54 and to be locked to the locking hole 54, and the assembling workability of the trim 12 in the periphery of the airbag device 20 can be improved.

When the protruding support portion is likely to be deformed, use of a special clip is considered such that the trim 12 can be easily and reliably assembled even if the protruding support portion is deformed. However, improvement of the assembling workability of the trim 12 obtained by reducing the deformation of the protruding support portion 50 increases the availability of a general-purpose clip.

In addition, since the locking portion is the locking hole 54, the protruding support portion 50 is likely to be deformed at the peripheral edge of the locking hole 54. However, the deformation of the peripheral edge of the locking hole 54 can be effectively reduced by the reinforcing portion 53.

In addition, the reinforcing portion 53 is formed in a shape including the surface 53f. A distance between the surface 53f and the tip end side edge portion 52 increases as the surface 53f is extended from the locking hole 54 toward the tip end side edge portion 52. Therefore, the protruding support portion 50 is reinforced, as it gets closer to a tip end side of the protruding support portion 50 is reinforced, to be less likely to be deformed thanks to a portion forming a surface distanced from the tip end side edge portion 52 of the protruding support portion 50.

In addition, since the reinforcing portion 53 includes the beam portion 53a and the column portion 53b, it is possible to reinforce the protruding support portion 50 by the reinforcing portion 53 while reducing weight and employed materials. In addition, according to the above configuration, since a space is provided between the tip end side edge portion 52 and the beam portion 53a, it is possible to prevent the protruding support portion 50 from becoming too thick, and thus it is possible to reduce a sink mark in resin after molding of the protruding support portion 50 by a mold.

In addition, since the column portion 53b includes a portion provided within a range in which the locking hole 54 is provided, in the longitudinal direction of the tip end side edge portion 52, the column portion 53b can effectively make a portion of the protruding support portion 50, in which the locking hole 54 is provided, less likely to be deformed.

As described, since the column portion 53b is provided at a portion of the protruding support portion 50 that is likely to be deformed, it is possible to make the deformation of the tip end side edge portion 52 of the protruding support portion 50 as uniform as possible, and thus the assembling workability of the trim 12 is further improved.

In addition, since the protruding support portion 50 is supported from the side opposite to the trim 12 by the supporting rib portion 60 and the additional support portion 70 that are the support portions, a force of the locking projection 14 pushing the protruding support portion 50 toward the side opposite to the trim 12 is received by the supporting rib portion 60 and the additional support portion 70. Accordingly, the protruding support portion 50 is less likely to be deformed toward the side opposite to the trim 12 with respect to the base end side edge portion 51 as a center. Accordingly, the locking projection 14 can easily pass through the locking hole 54 and be locked to the locking hole 54, and the assembling workability of the trim 12 in the periphery of the airbag device 20 can be improved.

In addition, since the support portion includes the supporting rib portion 60 that extends continuously, from the column portion 53b, to the peripheral wall portion 46, it is possible to effectively support the portion of the protruding support portion 50 in which the column portion 53b is provided. The protruding support portion 50 is less likely to be entirely or partially deformed.

In particular, the support portion includes the supporting rib portion 60 as a portion that is provided integrally with the airbag lid 40 between the protruding support portion 50 and the peripheral wall portion 46. Here, the airbag lid 40 is formed of a material that is easy to deform when the airbag 22 inflates and deploys. However, the peripheral wall portion 46 is connected to the attachment member 30. Therefore, the peripheral wall portion 46 is less likely to be deformed than other portions of the airbag lid 40. Since the supporting rib portion 60 is provided integrally with the peripheral wall portion 46 that is relatively less likely to be deformed, deformation of the protruding support portion 50 is effectively reduced by the supporting rib portion 60.

Since the supporting rib portion 60 extends from the base end side edge portion 51 toward the tip end side edge portion 52 with respect to the protruding support portion 50, deformation of the protruding support portion 50 between the base end side edge portion 51 and the tip end side edge portion 52 can be effectively reduced.

In addition, there is an advantage that a portion of the locking projection 14 protruding from the locking hole 54 is protected by the protruding support portion 50, and the locking of the locking projection 14 is more reliably maintained.

The configurations described in the above-described embodiment and modifications can be combined as appropriate as long as they do not contradict each other.

The above description is an example in all aspects, and the present invention is not limited thereto. It is to be understood that numerous modifications that are not illustrated can be conceived without departing from the scope of the present invention.

The present specification and the drawings disclose the following aspects.

A first aspect is an airbag device of which a trim of a vehicle is attached to a periphery. The airbag device including: a folded airbag; an attachment member configured to house the folded airbag and to be fixed to the vehicle; and an airbag lid including a main body portion and a protruding support portion. The main body portion is connected to the attachment member in a state of covering the folded airbag from a side opposite to the attachment member. The protruding support portion protruding from the main body portion. At least a part of the protruding support portion being covered by the trim. The protruding support portion includes: a base end side edge portion joined to the main body portion; a tip end side edge portion provided on a side opposite to the base end side edge portion; a locking portion attaching to the trim and provided between the base end side edge portion and the tip end side edge portion; and a reinforcing portion provided continuously along the tip end side edge portion.

According to this airbag device, when a counterpart locking portion is attached to the locking portion in a locked state, partial deformation of the protruding support portion is reduced by the reinforcing portion. Therefore, when assembling the trim, even if the counterpart locking portion pushes the locking portion of the protruding support portion, the protruding support portion is less likely to be deformed partially, and the assembling workability of the trim in the periphery of the airbag device can be improved.

A second aspect is the airbag device according to the first aspect, in which the locking portion is a locking hole into which a locking projection, as a counterpart locking portion, provided on the trim is pushed to be locked. The locking hole is provided between the base end side edge portion and the tip end side edge portion.

In this case, when the locking projection is pushed into the locking hole, a peripheral edge portion of the locking hole is less likely to be deformed thanks to the reinforcing portion, and thus the assembling workability of the trim in the periphery of the airbag device can be further improved.

A third aspect is the airbag device according to the first or second aspect, further including: a support portion configured to support the protruding support portion from a side opposite to the trim.

In this case, when the counterpart locking portion is attached to the locking portion in a locked state, the entire protruding support portion is supported by the support portion so as not to be easily deformed toward the side opposite to the trim. Therefore, when assembling the trim, even if the counterpart locking portion pushes the locking portion of the protruding support portion, the protruding support portion is less likely to be deformed entirely, and the assembling workability of the trim in the periphery of the airbag device can be improved.

A fourth aspect is the airbag device according to the third aspect, in which the main body portion includes a garnish portion exposed to an interior of the vehicle, and a peripheral wall portion protruding from the garnish portion toward the attachment member to surround the folded airbag and connected to the attachment member, and the support portion includes a portion provided integrally with the airbag lid between the protruding support portion and the peripheral wall portion.

In this case, since the support portion includes a portion that is provided integrally with the airbag lid between the protruding support portion and the peripheral wall portion, the protruding support portion is also supported by the peripheral wall portion via the support portion, and the protruding support portion is less likely to be deformed.

A fifth aspect is the airbag device according to any one of the first to fourth aspects, in which the reinforcing portion is formed in a shape with a surface, and a distance between the surface and the tip end side edge portion increases as the surface is extended from the locking portion toward the tip end side edge portion.

In this case, a portion of the protruding support portion that is closer to the tip end side edge portion can be reinforced by the reinforcing portion so as to be less likely to be deformed.

A sixth aspect is the airbag device according to any one of the first to fifth aspects, in which the reinforcing portion includes a beam portion and a column portion. The beam portion extends along a longitudinal direction of the tip end side edge portion in a state where a space is provided between the reinforcing portion and the tip end side edge portion. The column portion connects the beam portion to the tip end side edge portion and is provided between the tip end side edge portion and the beam portion.

Accordingly, it is possible to reinforce the protruding support portion by the reinforcing portion while reducing weight and employed materials.

A seventh aspect is the airbag device according to the sixth aspect, in which the column portion includes a portion that is provided within a range in which the locking portion is provided, in a longitudinal direction of the tip end side edge portion.

Accordingly, it is possible to effectively make the portion of the protruding support portion, in which the locking portion is provided, less likely to be deformed by the column portion.

What is claimed is:

1. An airbag device of which a trim of a vehicle is attached to a periphery, the airbag device comprising:
    a folded airbag;
    an attachment member configured to house the folded airbag and to be fixed to the vehicle; and
    an airbag lid including a main body portion and a protruding support portion, the main body portion being connected to the attachment member in a state of covering the folded airbag from a side opposite to the attachment member, the protruding support portion protruding from the main body portion, at least a part of the protruding support portion being covered by the trim,
    wherein the protruding support portion includes:
        a base end side edge portion joined to the main body portion;
        a tip end side edge portion provided on a side opposite to the base end side edge portion;
        a locking portion attaching to the trim and provided between the base end side edge portion and the tip end side edge portion; and
        a reinforcing portion provided continuously along the tip end side edge portion.

2. The airbag device according to claim 1,
    wherein the locking portion is a locking hole into which a locking projection, as a counterpart locking portion, provided on the trim is pushed to be locked, the locking hole being provided between the base end side edge portion and the tip end side edge portion.

3. The airbag device according to claim 1, further comprising:
    a support portion configured to support the protruding support portion from a side opposite to the trim.

4. The airbag device according to claim 3,
    wherein the main body portion includes a garnish portion exposed to an interior of the vehicle, and a peripheral wall portion protruding from the garnish portion toward the attachment member to surround the folded airbag and connected to the attachment member, and
    the support portion includes a portion provided integrally with the airbag lid between the protruding support portion and the peripheral wall portion.

5. The airbag device according to claim 1,
    wherein the reinforcing portion is formed in a shape with a surface, and
    a distance between the surface and the tip end side edge portion increases as the surface is extended from the locking portion toward the tip end side edge portion.

6. The airbag device according to claim 1,
    wherein the reinforcing portion includes a beam portion and a column portion, the beam portion extending along a longitudinal direction of the tip end side edge portion in a state where a space is provided between the reinforcing portion and the tip end side edge portion, the column portion connecting the beam portion to the tip end side edge portion and being provided between the tip end side edge portion and the beam portion.

7. The airbag device according to claim 6,
wherein the column portion includes a portion that is provided within a range in which the locking portion is provided, in a longitudinal direction of the tip end side edge portion.

\* \* \* \* \*